(12) United States Patent
Yang

(10) Patent No.: US 7,188,641 B2
(45) Date of Patent: Mar. 13, 2007

(54) WATER VALVE ASSEMBLY FOR BATHROOM FAUCETS

(76) Inventor: Tsai Chen Yang, 235 Chung-Ho, Box 8-24, Taipei (TW)

( * ) Notice: Subject to any disclaimer, the term of this patent is extended or adjusted under 35 U.S.C. 154(b) by 35 days.

(21) Appl. No.: 11/081,098

(22) Filed: Mar. 16, 2005

(65) Prior Publication Data
US 2006/0207664 A1   Sep. 21, 2006

(51) Int. Cl.
*E03C 1/04* (2006.01)
(52) U.S. Cl. .................. 137/597; 137/625.46; 251/288
(58) Field of Classification Search ................ 137/597, 137/625.46; 251/288
See application file for complete search history.

(56) References Cited
U.S. PATENT DOCUMENTS 4,951,702 A * 8/1990 Brotcke ..................... 137/597
5,884,652 A * 3/1999 Yeh et al. .................... 137/98
6,095,176 A * 8/2000 Yang .......................... 137/98
6,267,134 B1 * 7/2001 Chen .......................... 137/98
6,453,943 B1 * 9/2002 Chang ....................... 137/597

* cited by examiner

Primary Examiner—Eric Keasel
Assistant Examiner—Craig Price

(57) ABSTRACT

A water valve assembly for bathroom faucets, comprising a water passage, an accommodating cavity and a flow diverting unit, whereby the flow pathway within a faucet can be adjusted. The accommodating cavity has a first cavity portion and a second cavity portion, the second cavity portion being connected to the water passage and provided with two water holes respectively connected to two water outlets. The flow diverting unit, being capable of rotating within the accommodating cavity, has a first end rotatably sealing the first cavity portion and a second end coupled to the outer body of the faucet by a limiting member, whereby the rotation of the flow diverting unit with respect to the accommodating cavity will be limited, and whereby a blocking member of the second end of the flow diverting unit can seal either of the water holes.

3 Claims, 5 Drawing Sheets

WATER VALVE ASSEMBLY FOR BATHROOM FAUCETS

FIELD OF THE INVENTION

The present invention relates to water valve assemblies, and more particularly to a water valve assembly for bathroom faucets whereby the water flow path can be adjusted.

BACKGROUND OF THE INVENTION

Water valve assemblies for bathroom of the prior art are used in a bathroom faucet for controlling water temperature and flow rate. They can also switch the water flow path between a spout and a shower head. As shown in FIGS. 1 and 2 in U.S. Pat. No. 6,453,943, a conventional valve assembly firstly directs water flow from a primary valve 11 to an accommodating cavity 104, after which the direction of the flow is controlled by a secondary valve 13 and switched between a first outlet 105 and a second outlet 106. Although the invention can switch between the water outlets quickly, it does not has a tight control of the water flow; for example, the water designated to be ejected from the first outlet 105 will go, with a small portion, out of the second outlet 106 too, causing a problem of shower head leakage. The invention disclosed by U.S. Pat. No. 6,453,943 aims at overcoming this problem. As shown in FIGS. 3 to 8, a faucet assembly according to the invention utilizes a forced water diverting means. As water flows from a water mixing chamber 29 to a transit chamber 28 and then an accommodation cavity 221, the sealing member 33 of a secondary valve 30 blocks either a first outflow port 206 or a second outflow port 207, whereby a divergence of water passage is reinforced. Nevertheless, the water flow confining unit of the present invention uses the bottom wall 310 of the secondary valve 30. The bottom wall 310 is a coupling of a second passage 315 and a limiting member 26. As shown In FIG. 8 in the specification of U.S. Pat. No. 6,453,943, an elastomeric member 331 is urged to block the first outflow port 206, and the water is forced to flow into the second outflow port 207. However, part of the second outflow port 207 will be blocked by the bottom wall 310, which reduces the flow rate through the second outflow port 207. Therefore, an improvement of the invention of the prior art is necessarfry.

SUMMARY OF THE INVENTION

Accordingly, the primary objective of the present invention is to provide a water valve assembly for bathroom faucets wherein a flow diverting unit housed in an accommodating cavity that is connected to a water passage can reliably switch water pathways within a faucet without the above mentioned leakage problem.

The secondary objective of the present invention is to provide a water valve assembly for bathroom faucets wherein a limiting member formed by a limiting rod extended inward from the faucet body and an elongated groove in the upper portion of the accommodating cavity, and therefore the limiting member will not hinder the water flow.

It is a further objective of the present invention that the limiting member is simple and provides an additional function of retaining the flow diverting unit within the accommodating cavity, not only reducing the production cost but also enhancing the reliability of the product.

To achieve above object, the present invention provides water valve assembly for bathroom faucets, which comprises a water passage, an accommodating cavity and a flow diverting unit, whereby the flow pathway within a faucet can be adjusted. The accommodating cavity has a first cavity portion and a second cavity portion, the second cavity portion being connected to the water passage and provided with two water holes respectively connected to two water outlets. The flow diverting unit, being capable of rotating within the accommodating cavity, has a first end rotatably sealing the first cavity portion and a second end coupled to the outer body of the faucet by a limiting member, whereby the rotation of the flow diverting unit with respect to the accommodating cavity will be limited, and whereby a blocking member of the second end of the flow diverting unit can seal either of the water holes.

Figure 1:
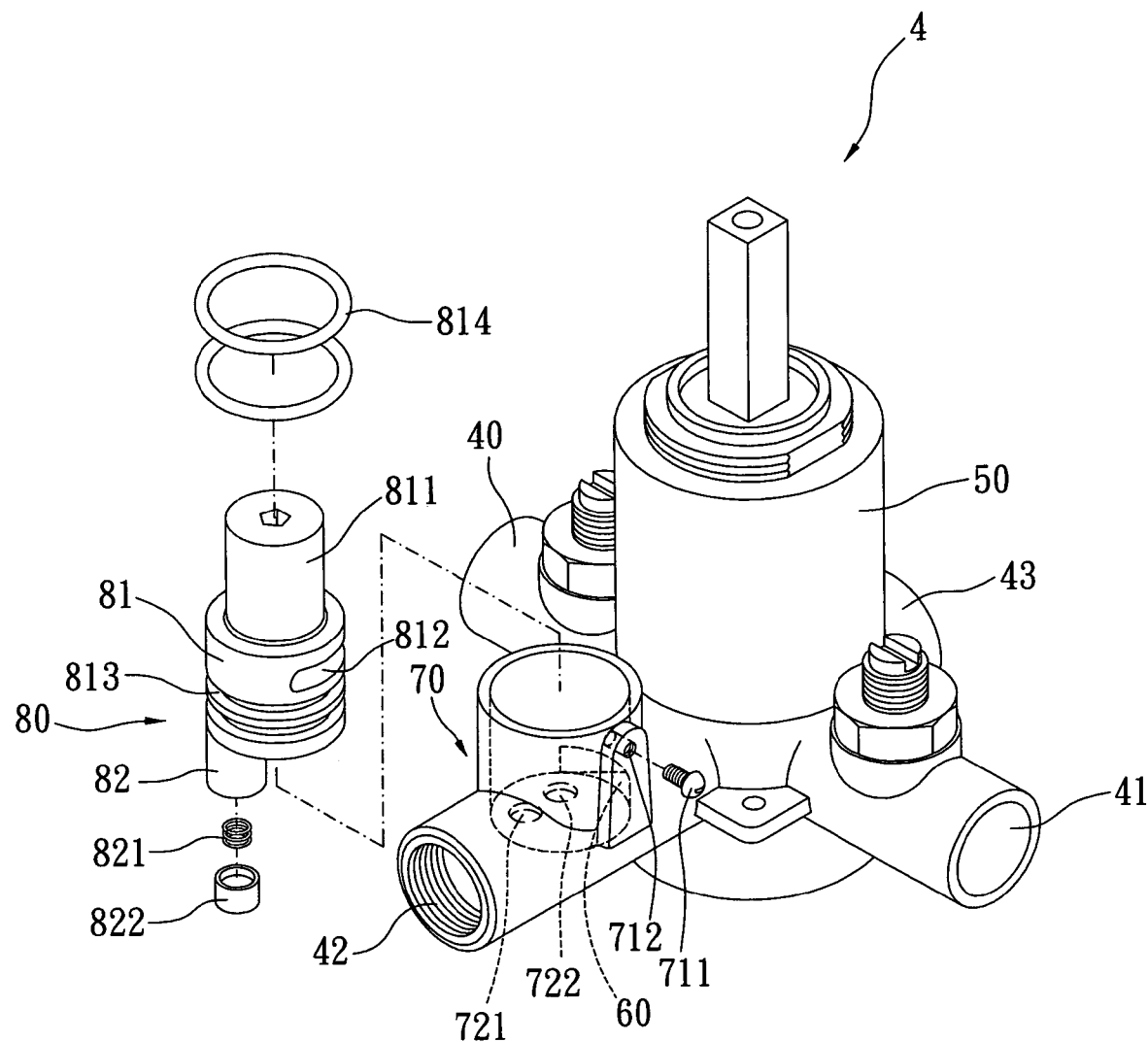
FIG. 1 is an exploded perspective view of a water valve assembly for bathroom faucets according to the present invention.
Figure 2:
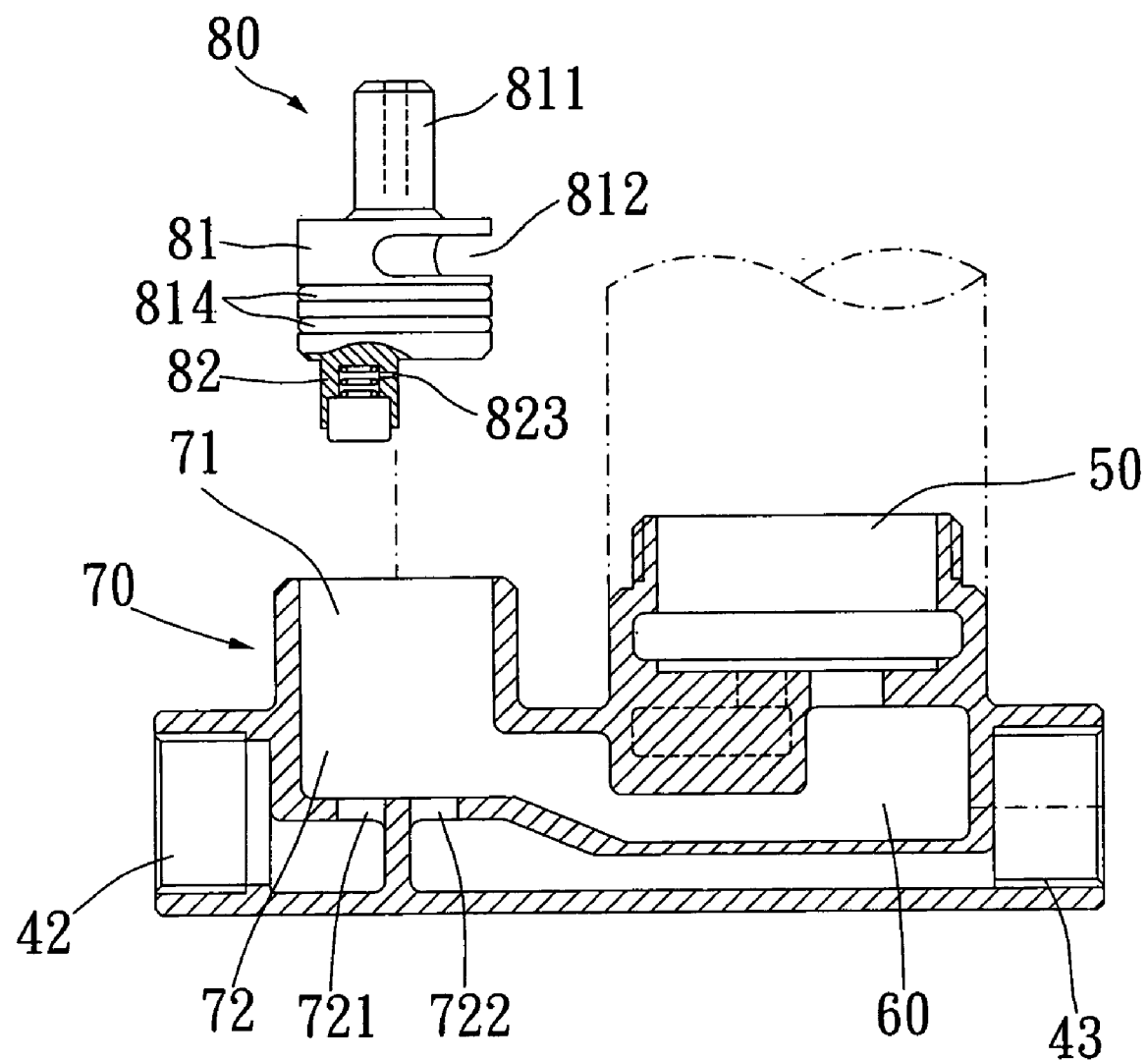
FIG. 2 is a cross-sectional view of the water passage of the water valve assembly for bathroom faucets in FIG. 1.
Figure 3:
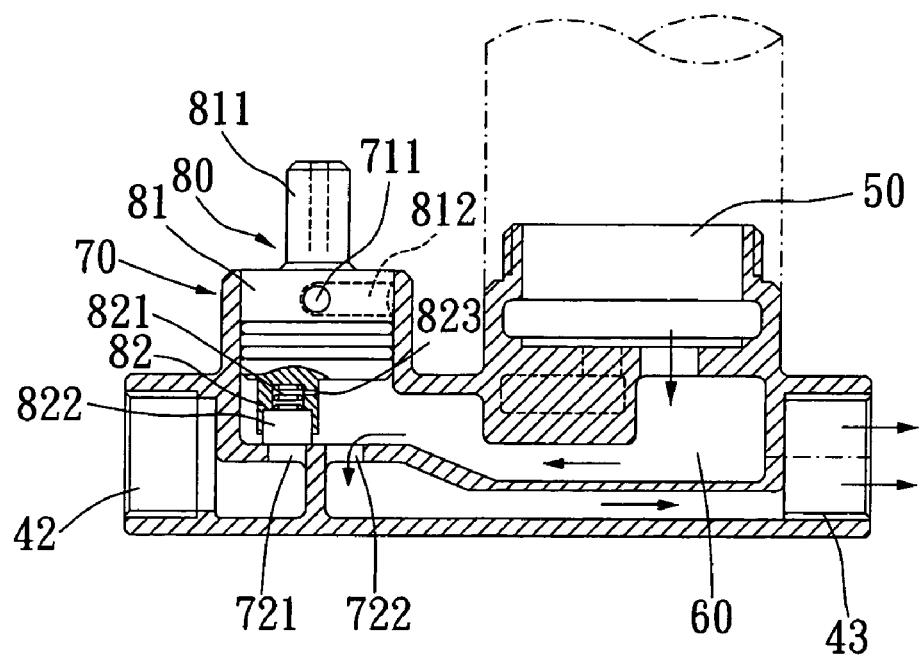
FIG. 3 illustrates water is flowing to the second water outlet of the water valve assembly for bathroom faucets in FIG. 1.
Figure 4:
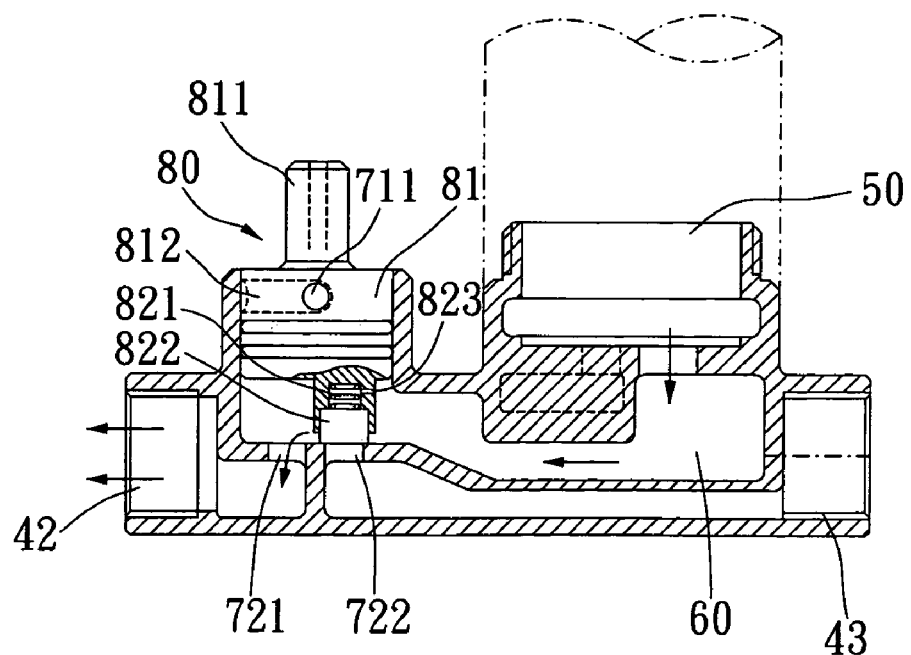
FIG. 4 illustrates water is flowing to the first water outlet of the water valve assembly for bathroom faucets in FIG. 1.
Figure 6:
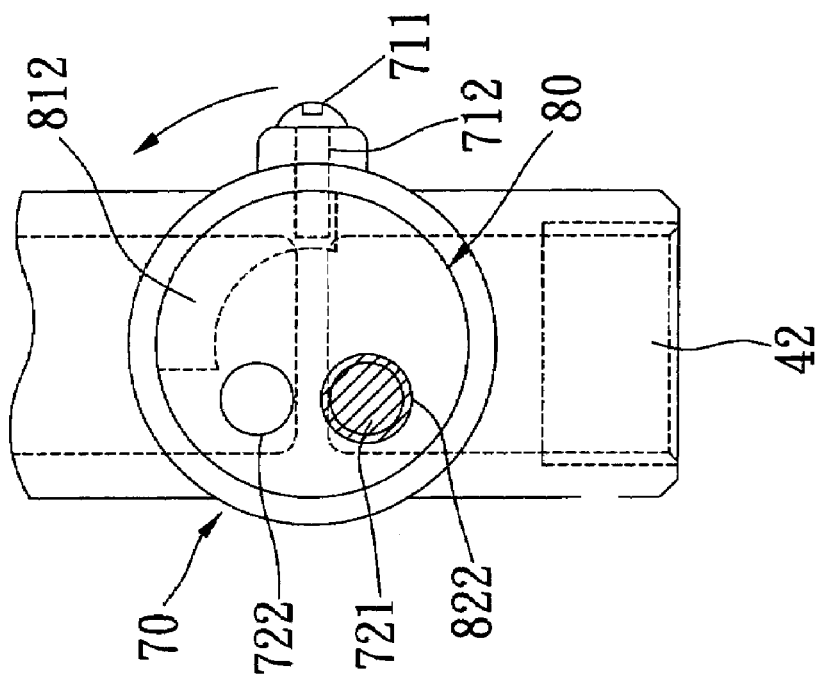
FIG. 6 illustrates the first water hole of the water valve assembly for bathroom faucets in FIG. 1 is sealed.
Figure 5:
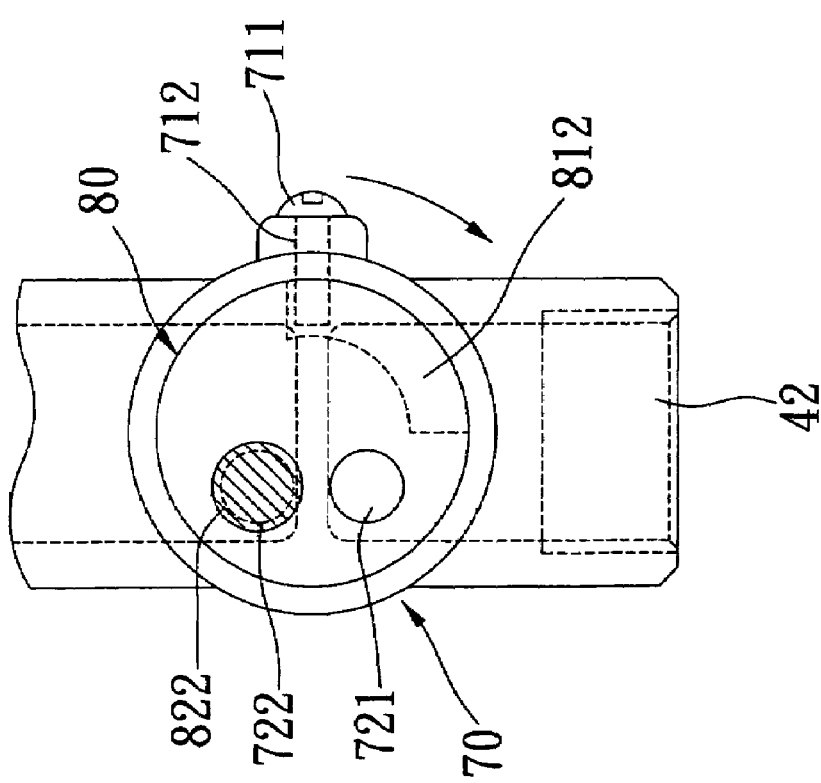
FIG. 5 illustrates the second water hole of the water valve assembly for bathroom faucets in FIG. 1 is sealed.
Figure 7:
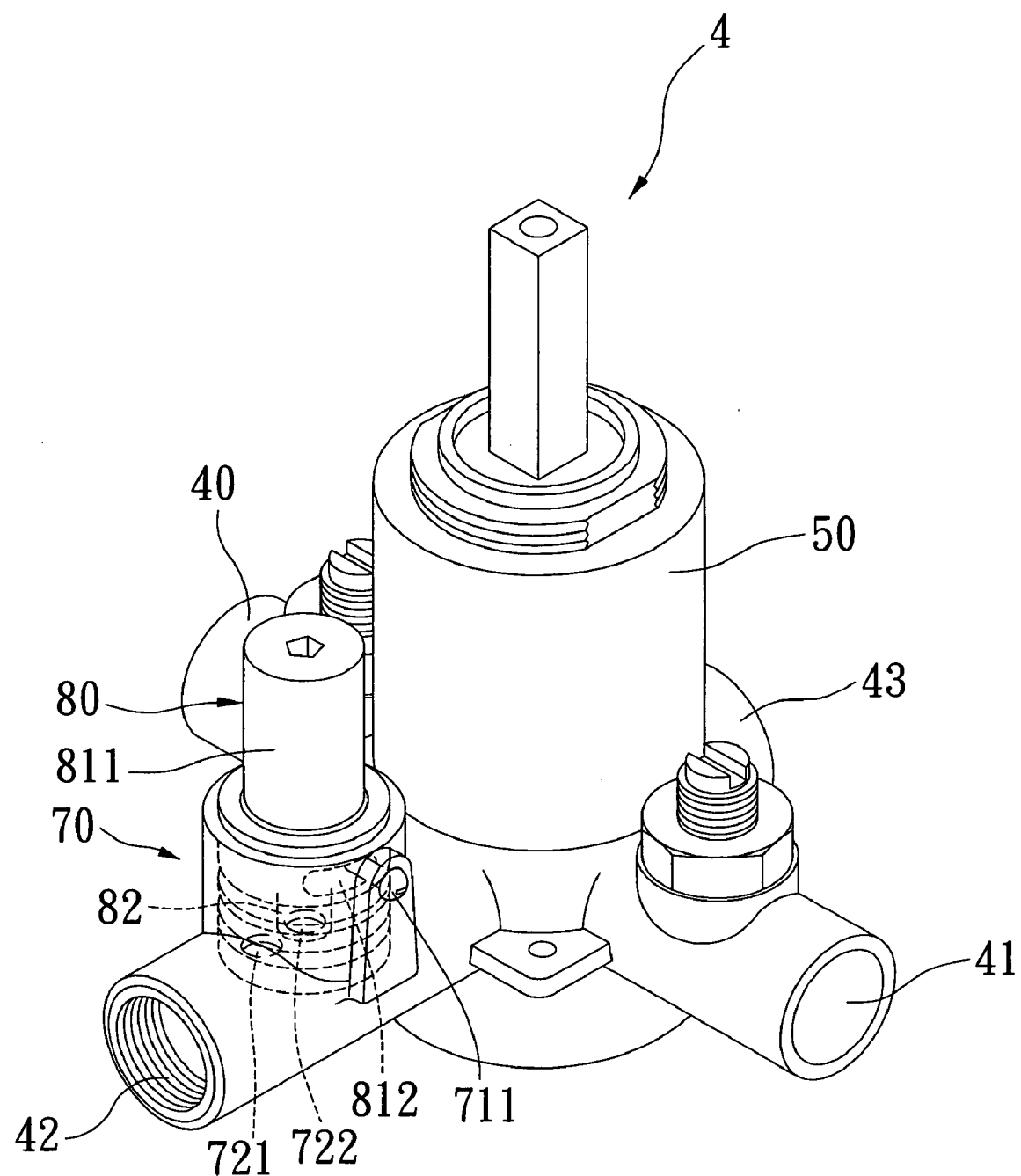
FIG. 7 is a perspective view of the water valve assembly for bathroom faucets in FIG. 1.

The various objects and advantages of the present invention will be more readily understood from the following detailed description when read in conjunction with the appended drawings.

DETAILED DESCRIPTION OF THE PREFERRED EMBODIMENTS

Referring to the attached figures, a water valve assembly 4 for bathroom according to the present invention comprises a water passage 60, an accommodating cavity 70 and a flow diverting unit 80. The accommodating cavity 70 further comprises a first cavity portion 71 and a second cavity portion 72 connected to the water passage 60. The second cavity portion 72 further includes a first water hole 721 connected to a first water outlet 42 and a second water hole 722 connected to a second water outlet 43. The flow diverting unit 80, housed in the accommodating cavity 70, has a first end 81, on top of which there is a handle mount 811 for the installation of a control handle, and a second end 82. There is an elongated limiting hole 812 opened horizontally along the lateral wall under the handle mount 811, whereby a limiting rod 711 mounted a screwed through hole 712 on the first cavity portion 71 of the accommodating cavity 70 will be inserted into the limiting hole 812. The limiting rod 711 is secured in the screwed through hole 712 to form a limiting member for retaining and securing the flow diverting unit 80 within the accommodating cavity 70. It further limits the rotation of the flow diverting unit 80 with respect to the water valve assembly 4. There are two annular grooves 813 under the limiting hole 812 for receiving gasket seals 814, whereby a flow from the flow diverting unit 80 to the first end 81 as water comes from the water passage 60 to the accommodating cavity 70 can be prevented. The second end 82 of the flow diverting unit 80 is provided with a receptacle for housing an elastic member 821 and a blocking piece 822, therefore forming a blocking member. The second end 82 is projected into the blocking member in the second cavity portion 72. The blocking member is rotatable between the first water hole 721 and the second water hole 722, which, as confined by the limiting member, can seal either the first water hole 721 or the second water hole 722. A lateral wall of the second end 82 is further provided with a small hole 823 for releasing excess pressure in the receptacle and therefore making the motion of the elastic member 821 smooth. It also helps the blocking piece 822 substantially block the first water hole 721 or the second water hole 722. The above described structure will fulfill the goal of adjusting water pathways.

To use the present invention, water flows into the water passage 60 through a first water inlet 40 and a second water inlet 41. As the water control unit 50 is opened, the water passage 60 and the second cavity portion 72 form a water passage. The rotation of the flow diverting unit 80, limited by the limiting member, urges the blocking member to seal either the first water hole 721 or the second water hole 722, directing the water flow to go through the unsealed hole. Because that the limiting member situates within the first cavity portion 71 and that there is only the blocking member at the second end 82 of the flow diverting unit 80 projected outward, only one of the first water hole 721 and the second water hole 722 is sealed at one time, and, therefore, water flows smoothly through the unsealed hole. Further, the first water hole 721 is connected to the first water outlet 42, and the second water hole 722 is connected to the second water outlet 43.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A water valve assembly for bathroom faucets, comprising:
    a water passage;
    an accommodating cavity having a first cavity portion and a second cavity portion, said second cavity portion being provided with two water holes respectively connected to two water outlets, said second cavity portion being connected to said water passage; and
    a flow diverting unit rotatably retained within said accommodating cavity having a first end and a second end, said first end being rotatably retained within said first cavity portion and sealing said first cavity portion, a limiting member being installed between said first end of said flow diverting unit and an outer wall of said bathroom faucet, whereby the rotation of said flow diverting unit within said accommodating cavity will be limited; said second end being a blocking member projected from a lower side of the first end and entering into said second cavity portion and rotatable between said water holes, whereby said blocking member can seal either of said water holes, and whereby the purpose of changing water pathways will be attained; wherein a lower portion of said flow diverting unit is formed so that water can not flow through said flow diverting unit, water flows from the first cavity portion into one of said water holes;
    wherein said limiting member consists of a limiting hole on a lateral side of said first end of said flow diverting unit and a limiting rod extended inward from said first cavity portion of said accommodating cavity; and
    wherein a lateral wall of the second end is further provided with a small hole for releasing excess pressure in the receptacle and therefore making the motion of the elastic member smooth; and
    wherein said first end of said flow diverting unit is provided with two annular grooves for retaining two gasket seals.

2. The water valve assembly for bathroom faucets of claim 1 wherein a top of said first end of said flow diverting unit is further provided with a handle mount for the installation of a flow control handle.

3. The water valve assembly for bathroom faucets of claim 1 wherein said second end of said flow diverting unit is provided with a receptacle for housing an elastic member and a blocking piece.

* * * * *